(12) United States Patent
Huskamp

(10) Patent No.: US 7,718,933 B2
(45) Date of Patent: May 18, 2010

(54) METHODS AND SYSTEMS FOR DIRECT MANUFACTURING TEMPERATURE CONTROL

(75) Inventor: Christopher S Huskamp, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/738,016

(22) Filed: Apr. 20, 2007

(65) Prior Publication Data
US 2008/0257879 A1 Oct. 23, 2008

(51) Int. Cl.
*H05B 1/02* (2006.01)
(52) U.S. Cl. .................. 219/494; 219/486; 219/497; 392/415; 392/416
(58) Field of Classification Search .............. 219/494, 219/483–488, 497, 499, 501, 506, 508, 505; 307/117, 38–42, 118; 392/411–421
See application file for complete search history.

(56) References Cited

U.S. PATENT DOCUMENTS

| | | | |
|---|---|---|---|
| 4,682,011 A * | 7/1987 | Hoffmann et al. ........... 219/390 |
| 5,155,321 A | 10/1992 | Grube et al. | |
| 5,278,938 A * | 1/1994 | Spigarelli et al. ........... 392/420 |
| 5,352,405 A | 10/1994 | Beaman et al. | |
| 5,458,476 A * | 10/1995 | Medwin ..................... 425/327 |
| 6,122,437 A * | 9/2000 | Johnson ..................... 392/376 |
| 6,815,636 B2 | 11/2004 | Chung et al. | |
| 6,822,194 B2 | 11/2004 | Low et al. | |
| 6,930,278 B1 | 8/2005 | Chung et al. | |
| 6,940,046 B2 * | 9/2005 | Dragon ...................... 219/243 |
| 7,197,239 B1 * | 3/2007 | Grande ...................... 392/418 |
| 2003/0222066 A1 | 12/2003 | Low et al. | |
| 2004/0021256 A1 | 2/2004 | DeGrange et al. | |
| 2004/0200816 A1 | 10/2004 | Chung et al. | |
| 2004/0254665 A1 | 12/2004 | Fink et al. | |
| 2005/0242473 A1 | 11/2005 | Newell et al. | |
| 2005/0278061 A1 | 12/2005 | DeGrange et al. | |
| 2006/0214335 A1 | 9/2006 | Cox | |

* cited by examiner

*Primary Examiner*—Mark H Paschall
(74) *Attorney, Agent, or Firm*—Armstrong Teasdale LLP

(57) ABSTRACT

Methods and systems for direct manufacturing are provided. The system includes a part bed, a deck disposed within the part bed, and a heater configured to heat a workpiece area adjacent the deck. The heater includes a plurality of individually movable heating elements wherein the heating elements are movable in a plane parallel with the deck, rotatable about an element mounting point such that an amount of heat directed towards the workpiece area is controllable using the rotation, and the heater is movable in a direction substantially normal to the deck.

20 Claims, 5 Drawing Sheets

METHODS AND SYSTEMS FOR DIRECT MANUFACTURING TEMPERATURE CONTROL

CROSS REFERENCE TO RELATED APPLICATION

This patent application is related to co-pending, commonly-owned U.S. patent application Ser. No. 11/737,962 entitled "Methods And Systems For Controlling And Adjusting Heat Distribution Over A Part Bed", concurrently herewith on Apr. 20, 2007, which application is hereby incorporated by reference.

BACKGROUND

Embodiments of the disclosure relate generally to methods and systems for manufacturing of composite structures, and more specifically, to methods and systems for controlling the temperature of a workpiece during a direct manufacturing process.

Direct manufacturing processes such as selective laser sintering (SLS) are used for producing parts and other freeform solid articles by building layers of material into the finished product. SLS is used to form such articles by sintering a powder together in a predetermined pattern representing a cross section of the article at a plurality of elevations. As used herein sintering is defined as a process by which particulates are made to form a solid mass through the application of external energy. During a SLS build process, the external energy is focused and controlled by controlling a laser to sinter selected locations of a heat-fusible powder. By performing this process layer-by-layer, complex parts and freeform solid articles which cannot be fabricated easily (if at all) by subtractive methods such as machining can be quickly and accurately fabricated. Accordingly, SLS is particularly beneficial in the production of prototype parts, and is particularly useful in the customized manufacture of such parts and articles directly from computer-aided-design data bases.

SLS is performed by depositing a layer of a heat-fusible powder onto a target surface; examples of the types of powders include metal powders, polymer powders such as wax that can be subsequently used in investment casting, ceramic powders, and plastics such as ABS plastic, polyvinyl chloride (PVC), polycarbonate, and other polymers. Portions of the layer of powder corresponding to a cross-sectional layer of the part to be produced are exposed to a focused and directionally controlled energy beam, such as generated by a laser having its direction controlled by mirrors, under the control of a computer. The portions of the powder exposed to the laser energy are sintered into a solid mass in the manner described hereinabove. After the selected portions of the layer have been so sintered or bonded, another layer of powder is placed over the layer previously selectively sintered, and the energy beam is directed to sinter portions of the new layer according to the next cross-sectional layer of the part to be produced. The sintering of each layer not only forms a solid mass within the layer, but also sinters each layer to previously sintered powder underlying the newly sintered portion.

However, known SLS systems typically experience a high incidence of warpage and shrinkage of the article due to thermal effects. Such warpage may result in the curling of a sintered layer such that the layer does not bond to an adjacent previously sintered layer. In cases where the layers of the part bond together, the part itself may warp. In many cases warpage may be caused by thermal shrinkage of the sintered layer during a transition from a sintering temperature to a temperature approaching the temperature of the workpiece area. Moreover, uneven cooling of the part during manufacture such that upper layers of the part are cooled more quickly than lower layers may contribute to warpage and curling.

Accordingly, accurate control of the temperature of the article being produced may facilitate reducing such warpage. At least some known systems use convective heating methods, which because of inconsistency in the flow of heated air in the workpiece area does not permit accurate control of the temperature of the article. Additionally, radiant heaters such as floodlamps, quartz rods, and conventional flat radiant panels placed near the target surface have been used to attempt to control the temperature of the part being produced. However, accurate control of temperature requires the expertise of expensive, educated personnel to manage the production process on each machine which significantly increases operating costs. Such variability experienced in both the mechanical and chemical properties of the part and in the process is a barrier preventing the transition of SLS direct manufacturing into a mainstream production process. Additionally, the currently used heater, a two zone, foil in ceramic element is limited to relatively low temperatures because a difference in the coefficient of thermal expansion (CTE) for the two materials causes the heater to self destruct at temperatures needed for improved process performance.

What are needed are methods and systems for providing sufficient energy in a spatially accurate workpiece area that can be controlled between different heating zones such that a differential temperature between different portions of an article being manufactured may be controlled to a predetermined value.

SUMMARY

In one embodiment, a system for direct manufacturing includes a part bed, a deck disposed within the part bed, and a heater configured to heat a workpiece area adjacent the deck. The heater includes a plurality of individually movable heating elements wherein the heating elements are movable in a plane parallel with the deck, rotatable about an element mounting point such that an amount of heat directed towards the workpiece area is controllable using the rotation, and the heater is movable in a direction substantially normal to the deck.

In another embodiment, a method of heating a workpiece includes monitoring a temperature of each of a plurality of heating zones in a workpiece area, determining a differential temperature between at least two of the heating zones, and controlling the energy delivered to the plurality of heating zones using the plurality of individually controllable heaters based on the determination such that the differential temperature is facilitated being reduced below a predetermined value, the plurality of heaters configured to deliver a quantity of energy to respective ones of the plurality of heating zones.

In yet another embodiment, a heater configured to provide energy to a workpiece includes a housing, and a plurality of heating elements mounted in the housing, the heating elements configured to be individually movable in a plane about a workpiece area, the heating elements configured to be individually rotatable about an element mounting point such that an amount of heat directed towards the workpiece area is controllable using the rotation.

DETAILED DESCRIPTION

The following detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure.

Figure 1:
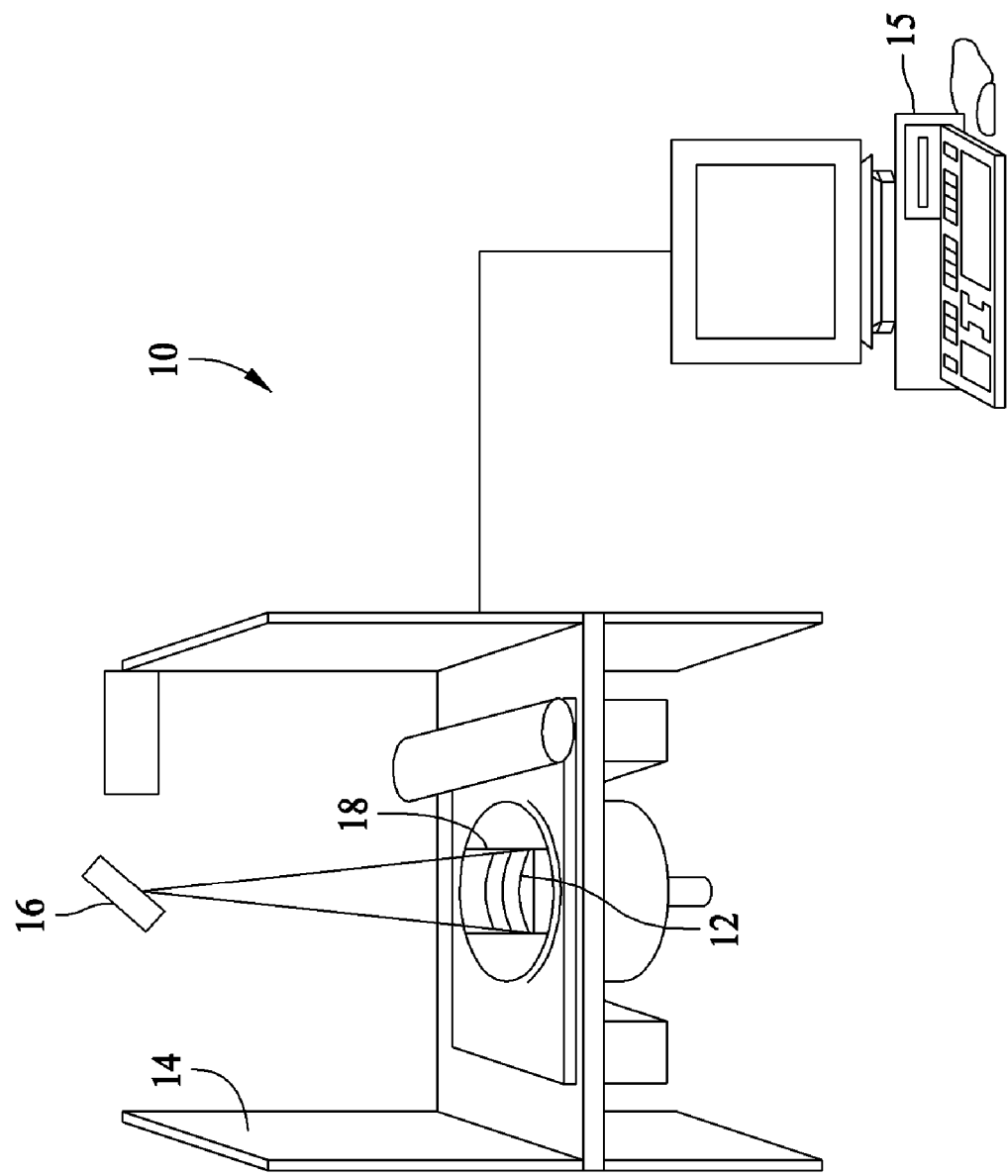
FIG. 1 is an illustration of a system utilized in the direct manufacture of articles in accordance with the methods described herein.

FIG. 1 is an illustration of a system 10 utilized in the direct manufacture of structures 12 in accordance with the methods described herein. In one embodiment, system 10 includes a direct manufacturing assembly 14, for example, a selective laser sintering assembly, to generate the desired structure (or structures) 12 in a single build run which is controlled utilizing a computer assembly 15. At least in the selective laser sintering example, direct manufacturing assembly 14 incorporates a laser 16 to integrally fabricate solid structures within a workpiece area or build chamber 18 during the build run.

Selective laser sintering (SLS) is a process for generating a material from a powdered sintering compound, and is one type of direct manufacturing process. In the SLS process, the powdered compound is distributed onto a surface within build chamber 18, and laser 16, is directed onto at least a portion of the powder, fusing those powder particles together to form a portion of a sintered material. Successive layers of the powder are distributed onto the surface, and the laser sintering process continues, fusing both the particles of the powdered material together into layers and the adjacent layers together, until the fused layers of laser sintered material are of a shape and thickness as appropriate for the intended use of the material. Although laser sintering has been described in the exemplary embodiment, other layer build methodologies are contemplated.

Figure 2:
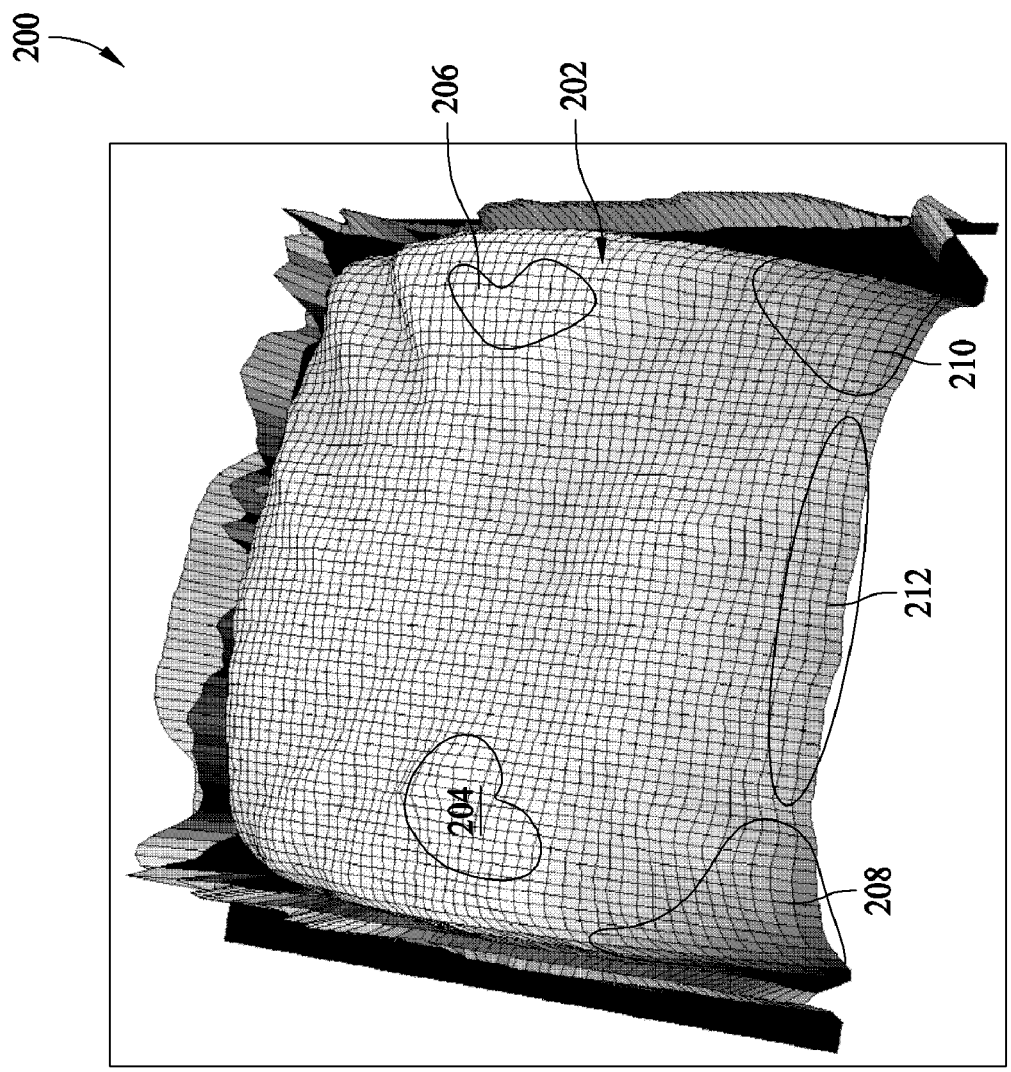
FIG. 2 is a thermal image of a workpiece area heated using a conventional heater.

FIG. 2 is a thermal image 200 of a workpiece area 202 heated using a conventional heater. Thermal image 200 illustrates areas of temperature of workpiece area 202. A first temperature area 204 and a second temperature area 206 includes a temperature indication of approximately 186° C. and a third temperature area 208 includes a temperature indication of approximately 165° C. A fourth temperature area 210, which is also located in a corner area of workpiece area 202, also exhibits a relatively lower temperature than first temperature area 204. A fifth temperature area 212, located along an outer edge of workpiece area 202, also exhibits a relatively lower temperature than first temperature area 204. Such areas, where the respective temperatures are different by a relatively large value, create temperature gradients in articles being manufactured in workpiece area 202.

In an effort to minimize such gradients experienced personnel attempt to adjust conditions in workpiece area 202. For example, visual indications of part bed temperature are obtained as a test build is heated to the melting point and the part bed is said to be 'glazed' or lightly melted. The only controls for this type application are part bed temperature as determined by a non contact IR sensor and center versus edge control of the part bed area.

Another control is the use of a plurality of linear quartz heaters positioned parallel to the edges of workpiece area 202. In conjunction, a low resolution offline calibration using indexed moves of the scanning mirrors over the part bed in an approximately a 15×15 grid where a non-contact infrared sensor monitors the total energy reflected by the mirror and approximates the differential point-to-point. The data is fed into an algorithm to generate a ratio of power to be delivered to the heaters to the power delivered to a master heater.

The current methods include a low to almost no resolution of the distinct heating zones of workpiece area 202 and yields thermal gradients that are still too large for consistent production. The use of coarse thermal input yields portions of the part bed that have large gradients within a short measured distance. This gives the resulting process a small window of acceptable operation; where as smaller thermal gradients would increase the range of acceptable operation.

Figure 3:
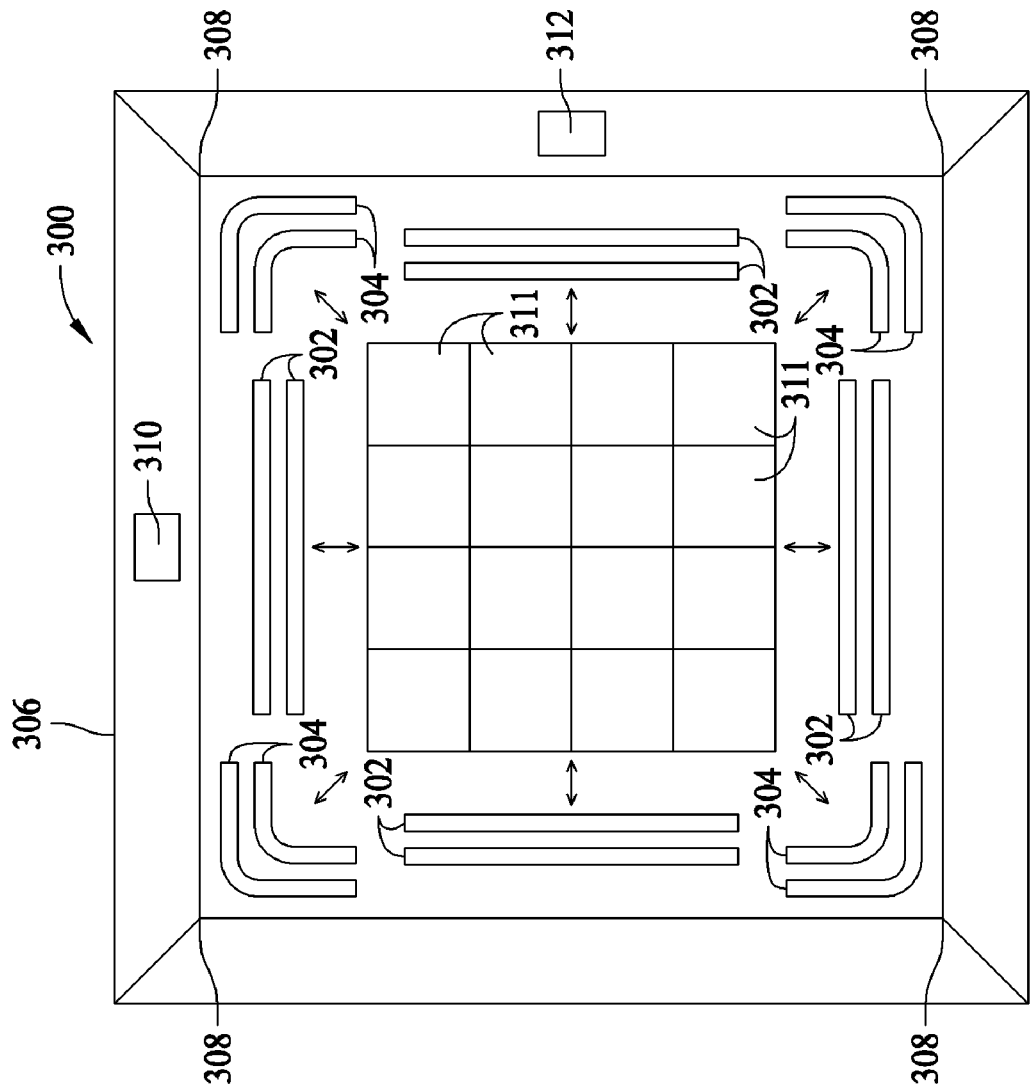
FIG. 3 is a perspective view of a heater looking upwardly from workpiece area in accordance with an embodiment of the disclosure that may be used with the SLS system shown in FIG. 1.

FIG. 3 is a perspective view of a heater 300 looking upwardly from workpiece area 18 in accordance with an embodiment of the disclosure that may be used with SLS system 10 (shown in FIG. 1). In the exemplary embodiment, heater 300 is configured to heat a workpiece area 18 adjacent a build deck in SLS system 10. Heater 300 includes a plurality of individually movable heating elements 302 and 304 mounted to a housing 306. Heating elements 302 and 304 are movable in a plane parallel with a build deck in workpiece area 18. Heating elements 302 are individually translatable in a direction normal to an adjacent edge of the heater towards a center of heater 300 and towards the edge of the heater. Heating elements 304 are individually translatable in a direction towards an adjacent corner of heater 300 and towards the center of heater 300.

Heating elements 302 and 304 are rotatable about an element mounting point such that an amount of heat directed towards workpiece area 18 is controllable using the rotation. Heater 300 is movable in an up and down direction in relation to workpiece area 18 that is substantially normal to the build deck. In the exemplary embodiment, heating elements 302 and 304 include conformal quartz rod elements that are configured to emit infrared radiation towards workpiece area 18. In the exemplary embodiment, heating elements 304 are shaped to substantially conform to a mounting location in a corner 308 of heater 300. In the exemplary embodiment, heating elements 302 and 304 include a plurality of substantially straight heating elements 302 and a plurality of heating elements 304 radiused about a corner of heater 300. In other embodiments, heating elements having other shapes are contemplated, such as but not limited to U-shaped and S-shaped.

System 10 further includes a temperature detector 310 configured to determine a temperature of the workpiece area and/or a temperature of a workpiece positioned in workpiece area 18. In one embodiment, temperature detector 310 is a thermal imager. In other embodiments, temperature detector 310 includes one or more thermal detectors. The plurality of thermal detectors may be spaced about the deck such that a temperature of a plurality of heating zones 311 can be determined. Temperatures of the plurality of heating zones 311 may therefore be determined by an imager, a plurality of thermal detectors each configured to determined a temperature of an associated zone, an infrared detector indexable to view different zones 311, or a plurality of temperature detectors such as but not limited to resistance temperature detectors or thermocouples positioned proximate an associated zone.

The various thermal detector possibilities described above may be communicatively coupled to control circuitry, which may be embodied in a control module 312 mounted locally with respect to heater 300 or may be included as a portion of computer assembly 15. The control circuitry is further in communication with heater 300 to individually control each heating element 302 and 304. The control circuitry is configured to individually control the output of at least one of the plurality of heating elements such that a temperature differential between the plurality of heating zones 311 is facilitated being maintained less than a predetermined value.

Heating elements 302 and 304 may be positioned in the plane parallel to the deck such that a temperature differential between the plurality of heating zones is facilitated being maintained less than a predetermined value. Heating elements 302 and 304 may be positioned manually in different locations or may be translated automatically using an actuator to move heating elements 302 and 304 from a first position to a second position during operation, between sintering operations, or between part build processes.

Heating elements 302 and 304 may be rotated about a mounting point such that a temperature differential between the plurality of heating zones is facilitated being maintained less a predetermined value. Such rotation may direct more or less radiation or other energy towards or away from the article being manufactured or workpiece area 18, which would tend to adjust the mix of heat reaching workpiece area 18 and the article.

Figure 4:
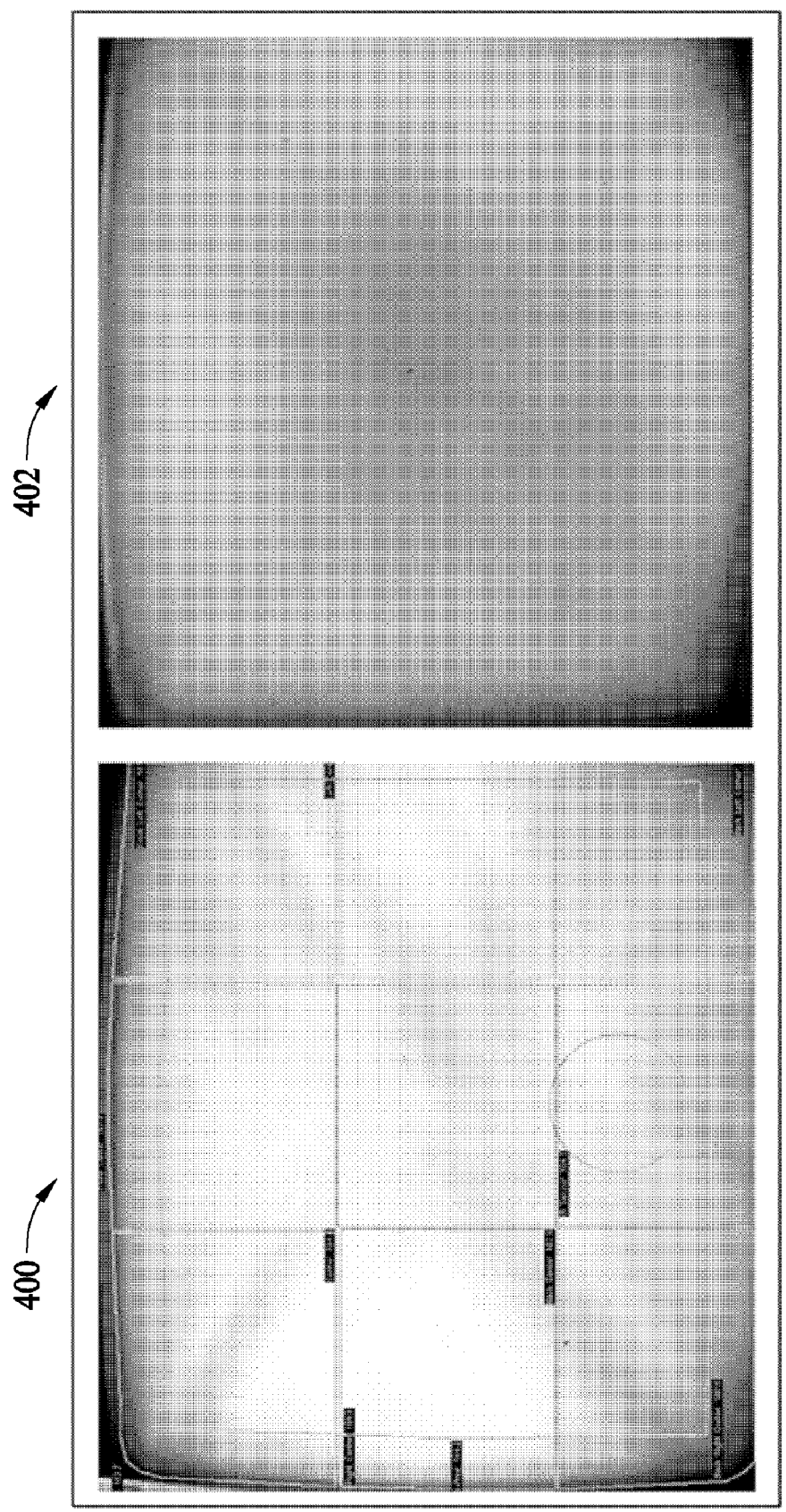
FIG. 4 is a comparison of a first thermogram of workpiece area heated using a known heater and a second thermogram of workpiece area heated using heater shown in FIG. 3.

FIG. 4 is a comparison of a first thermogram 400 of workpiece area 18 heated using a known heater and a second thermogram 402 of workpiece area 18 heated using heater 300 (shown in FIG. 3). First thermogram 400 illustrates workpiece area 18 with a differential temperature of approximately 10 degrees Celsius across several heating zones. Second thermogram 402 illustrates workpiece area 18 with a differential temperature of approximately 3 degrees Celsius across the entire workpiece area 18 using heater 300.

Figure 5:
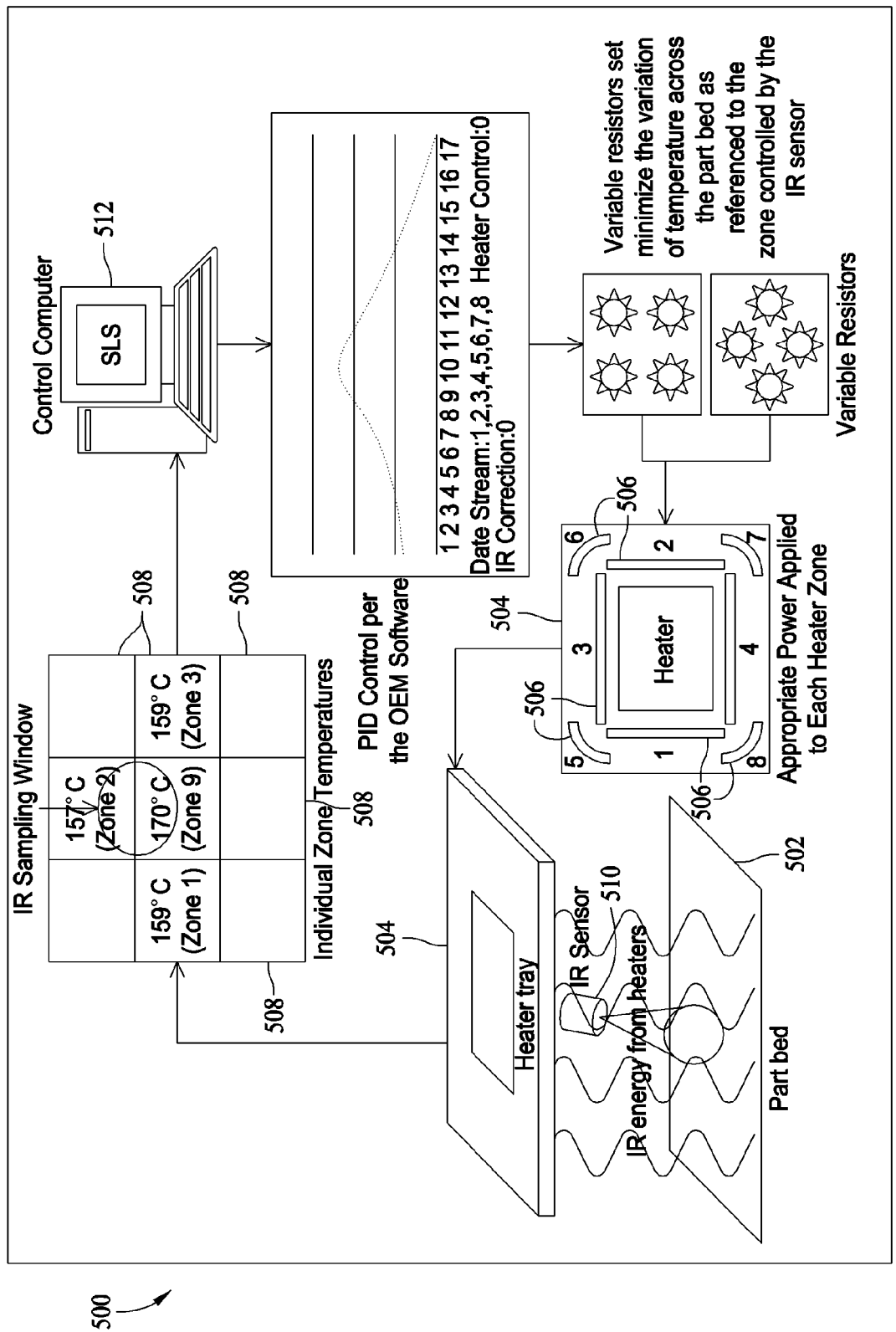
FIG. 5 is a schematic block diagram of an SLS system in accordance with an embodiment of the present disclosure.

FIG. 5 is a schematic block diagram of an SLS system 500 in accordance with an embodiment of the present disclosure. System 500 includes a workpiece area or part bed 502, where a workpiece or part to be manufactured (not shown) is fabricated. A heater 504 in accordance with the present disclosure is positioned above part bed 502 such that energy is directed downward from heater 504 towards part bed 502. Heater 504 includes a plurality of heating elements 506 that are individually positionable with respect to each other and heater 504 is positionable with respect to part bed 502. Part bed 502 is discernable into a plurality of individual heating zones 508 by a temperature sensor such as but not limited to an infrared sensor 510.

Temperature information from each temperature zone 508 is transmitted to an SLS system control computer 512. Computer 512 includes algorithms executing on a processor that determine electrical power outputs to be delivered to each heating element 506 to facilitate minimizing a temperature differential between heating zones 508. In one embodiment, the algorithms are able to correlate a change in the output of heating elements 506 with a change in the temperature of zones 508 such that computer 512 is able to learn an optimal change in outputs to heating elements 506 to facilitate achieving a minimal differential temperature between heating zones 508 during all SLS process operations. In another embodiment, calibrated values relating the output of heating elements 506 to changes in the differential temperature between heating zones 508 are determined and stored within a memory of computer 512 to be used during SLS process operations.

The algorithms may include or affect proportional, integral, differential controllers to facilitate controlling heating elements 506. For example, variable resistors, thyristors, SCRs, power MOSFETs and/or other power electronic devices may be used to control electrical power delivered to heating elements 506. In various embodiments, variable resistors may be manually controlled. In some embodiments, the position and/or rotation of heating elements are affected by actuators coupled between a respective heating element 506 and housing 504.

The above-described methods and systems for heating a workpiece are cost-effective and highly reliable. The methods and systems include a plurality of highly controllable conformal heating elements that positioned proximate an area where the workpiece is to be formed. A plurality of heating zones are monitored and the plurality of heaters is controlled to facilitate minimizing a temperature differential between the heating zones. Accordingly, the methods and systems facilitate reducing warpage of direct manufactured articles especially those fabricated using selective laser sintering processes in a cost-effective and reliable manner.

While embodiments of the disclosure have been described in terms of various specific embodiments, those skilled in the art will recognize that the embodiments of the disclosure can be practiced with modification within the spirit and scope of the claims.

What is claimed is:

1. A direct manufacturing system comprising:
a part bed;
a plurality of temperature detectors disposed about the part bed;
a deck disposed within the part bed, the deck divided into a plurality of heating zones;
a heater configured to heat the workpiece area adjacent the deck, said heater comprising a plurality of individually movable heating elements, said heating elements being movable in a plane parallel with the deck, each said heating element individually rotatable about its respective heating element mounting point such that an amount of heat directed towards the workpiece area is controllable using the rotation, said heater is movable in a direction substantially normal to the deck; and
control circuitry in communication with the heater and the temperature detectors, said control circuitry operable to individually control an output and a positioning of said heating elements, based on outputs of said temperature detectors, to maintain a temperature differential between the plurality of heating zones that is less than a predetermined value.

2. A system in accordance with claim 1 wherein said heater is configured to emit radiation towards the workpiece area.

3. A system in accordance with claim 2 wherein radiation emitted by the element towards the workpiece area is controllable using the rotation of the element about the mounting point.

4. A system in accordance with claim 1 comprising at least one heating element shaped to substantially conform to a mounting location in a corner of the heater.

5. A system in accordance with claim 1 wherein said temperature detectors are configured to determine at least one of a temperature of the workpiece area and a temperature of a workpiece positioned in the workpiece area.

6. A system in accordance with claim 1 wherein said temperature detectors comprise thermal imaging devices.

7. A system in accordance with claim 1 wherein said temperature detectors comprise a plurality of temperature elements spaced about the deck such that a temperature of a plurality of zones can be determined.

8. A system in accordance with claim 1 wherein said heating elements are positioned in the plane parallel to the deck.

9. A system in accordance with claim 1 wherein said elements are rotated about a mounting point to maintain the temperature differential between the plurality of heating zones.

10. A system in accordance with claim 1 wherein said heating elements comprise a plurality of substantially straight heating elements and a plurality of heating elements radiused about a corner of the heater.

11. A heater configured to provide energy to a workpiece comprising:
   a housing;
   a plurality of heating elements mounted in said housing, said heating elements configured to be individually movable in a plane about a workpiece area, said heating elements configured to be individually rotatable about a heating element mounting point such that an amount of heat directed towards the workpiece area is controllable using the rotation;
   a plurality of temperature detectors dispersed within the workpiece area; and
   control circuitry in communication with said heating elements, said control circuitry operable to individually control an output and a positioning of said heating elements, based on outputs of said temperature detectors, to maintain a temperature differential between heating zones defined within the workpiece area.

12. A heater in accordance with claim 11 wherein said housing is movable both towards and away from the workpiece area.

13. A heater in accordance with claim 11 wherein said heater is configured to emit radiation towards the workpiece area.

14. A heater in accordance with claim 13 wherein radiation emitted by the element towards the workpiece area is controllable using the rotation of the element about the mounting point.

15. A heater in accordance with claim 11 wherein at least one heating element is shaped to substantially conform to a mounting location in a corner of the heater.

16. A heater in accordance with claim 11 wherein said heating elements are at least one of positioned in the plane about the workpiece area, rotated into a position that emits a predetermined amount of radiation towards the workpiece area, and controlled electrically to generate a predetermined amount of radiation, and combinations thereof such that a temperature differential between the plurality of heating zones is facilitated being maintained less than about five degrees Celsius.

17. A heater in accordance with claim 16 wherein the temperature differential between the plurality of heating zones is facilitated being maintained less than about two degrees Celsius.

18. A heater in accordance with claim 11 wherein the heating zones defined within the workpiece area comprise a deck divided into a plurality of heating zones, said elements rotated about a mounting point such that a temperature differential between the plurality of heating zones is facilitated being maintained less a predetermined value.

19. A heater in accordance with claim 11 wherein said plurality of heating elements comprise a plurality of substantially straight heating elements and a plurality of heating elements radiused about a corner of the heater.

20. A heater in accordance with claim 11 configured to maintain a temperature of at least one of a workpiece and a workpiece area in a range of about twenty degrees Celsius to about four hundred degrees Celsius.

* * * * *